(12) United States Patent
Haas et al.

(10) Patent No.: US 12,153,067 B2
(45) Date of Patent: Nov. 26, 2024

(54) MEASURING ARRANGEMENT

(71) Applicant: VEGA GRIESHABER KG, Wolfach (DE)

(72) Inventors: Juergen Haas, Oberwolfach (DE); Matthias Harter, Schenkenzell (DE); Ralf Körnle, Zell a.H. (DE); Robert Laun, Hausach (DE); Fabian Rank, Wolfach (DE); Natalie Waldecker, Ortenburg (DE); Winfried Rauer, Fischerbach (DE)

(73) Assignee: VEGA GRIESHABER, Wolfach (DE)

( * ) Notice: Subject to any disclaimer, the term of this patent is extended or adjusted under 35 U.S.C. 154(b) by 377 days.

(21) Appl. No.: 17/178,008

(22) Filed: Feb. 17, 2021

(65) Prior Publication Data
US 2021/0325417 A1 Oct. 21, 2021

(30) Foreign Application Priority Data

Apr. 9, 2020 (DE) ...................... 10 2020 110 025.6

(51) Int. Cl.
*G01P 3/00* (2006.01)
*G01D 21/02* (2006.01)

(52) U.S. Cl.
CPC ................ *G01P 3/00* (2013.01); *G01D 21/02* (2013.01)

(58) Field of Classification Search
CPC .................................. G01D 21/02; G01P 3/00
See application file for complete search history.

(56) References Cited

U.S. PATENT DOCUMENTS

| 8,022,367 B2 * | 9/2011 | Finch ................. G08B 13/1436 250/340 |
| 2017/0050588 A1 * | 2/2017 | Hammerschmidt ..... G07C 5/02 |
| 2019/0236863 A1 * | 8/2019 | Kwak .................. G07C 5/0808 |
| 2021/0270661 A1 * | 9/2021 | Kirst ................... G01F 23/0007 |

FOREIGN PATENT DOCUMENTS

| DE | 102004051275 A1 | 4/2006 |
| DE | 102012112687 A1 | 6/2014 |

OTHER PUBLICATIONS

GPTO office action for related German application 10 2020 110 025.6 dated Nov. 20, 2020.

* cited by examiner

*Primary Examiner* — Paul M. West
(74) *Attorney, Agent, or Firm* — William Gray Mitchell

(57) ABSTRACT

A measuring arrangement having a first dual conductor field device with a first sensor and a first dual conductor interface for the power supply of the first dual conductor field device and for the transmission of data from the dual conductor field device to a superordinate unit, wherein the first dual conductor field device has at least one second dual conductor interface suitably designed to receive data from at least one second dual conductor field device.

10 Claims, 2 Drawing Sheets

MEASURING ARRANGEMENT

CROSS REFERENCE TO RELATED APPLICATIONS

This patent application claims priority to German Patent Application 10 2020 110 025.6, filed on Apr. 9, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a measuring arrangement with dual conductor field device.

Background of the Invention

Measuring arrangements with dual conductor field devices are known from the prior art in various embodiments.

A dual conductor field device according to the present application is understood to be a field device that is connected to a superordinate unit via two lines, wherein both a power supply and a measurement value transmission occur via these two lines.

The power and/or signal transmission between the dual conductor field device and the superordinate units occurs according to the known 4 mA to 20 mA standard, in which a 4 mA to 20 mA current loop, i.e. a two-wire line, is formed between the field device and the superordinate unit. In this form of transmission, the measurement signal is converted into a current value between 4 mA and 20 mA and transmitted as such to the superordinate unit. In addition to or alternatively to the analog transmission of signals, there is the possibility that the measuring devices transmit further information to the superordinate unit or receive further information from it according to various other protocols, in particular digital protocols. The HART protocol or the Profibus PA protocol are mentioned as examples for this.

The power supply of these field devices also occurs via the 4 mA to 20 mA current signal, so that no additional power supply line is necessary in addition to the two-wire line. In order to keep the wiring and installation effort as well as the safety measures, for example when used in explosion-proof areas, as minor as possible, it is also not desired to provide additional power supply lines.

For dual conductor field devices, the available input power is significantly limited. The electronics in the field device must be designed in such a way that they still work reliably even with a minimum signal current of 4 mA.

For applications with an increased power requirement, it is also known for a field device to have two dual conductor interfaces. In these field devices, via the second dual conductor interface, either a power supply can take place exclusively or additional measurement values can be transmitted from the dual conductor field device to the superordinate unit.

Such a measuring arrangement 100 according to the prior art is shown in FIG. 4.

The measuring arrangement 100 comprises a first dual conductor field device 1 with a first sensor 10, which is connected to an electronic module 14. In the present exemplary embodiment, the electronic module 14 comprises a first dual conductor interface 11 and a second dual conductor interface 12, wherein these are shown as separate components at the output of the dual conductor field device 1 for better illustration. The electronic module 14 is connected to a superordinate unit 5 via the first dual conductor interface 11 by means of a two-wire line. The electronic module 14 communicates via the first dual conductor interface 11 with the superordinate unit 5 according to the 4 mA to 20 mA standard and is also supplied with power by the superordinate unit 5 according to this standard. In addition to an analog communication according to the 4 mA to 20 mA standard, digital communication can also occur between the first dual conductor interface 11 and the superordinate unit 5, for example according to the HART protocol. Because the first dual conductor field device 1 according to the present illustration has an increased power requirement, the first dual conductor field device 1 is equipped with a second dual conductor interface 12. The electronic module 14 is connected to a second superordinate unit 5.2 via the second dual conductor interface 12. In this configuration, the second dual conductor interface 12 can either serve purely for power supply, so that the second superordinate unit 5.2 can be designed, for example, as a feeder device, i.e. as a pure power supply. Alternatively, the second superordinate unit 5.2 can also allow a data transmission, so that the first dual conductor field device 1 can transmit measurement values to the second superordinate unit 5.2 via an additional analog channel. A digital communication can also take place via the second dual conductor interface 12 as well as via the first dual conductor interface 11.

In applications of automation technology, there is an increasing need for field devices that calculate a measurement value on the basis of additional external information.

The term automation technology is understood to mean a sub-area of technology that includes all measures for the operation of machines and systems without the involvement of humans. One goal of the associated process automation is to automate the interplay of individual components of a plant in the chemical, food, pharmaceutical, crude oil, paper, cement, shipping, and mining sectors. For this purpose, a variety of sensors can be used, which are adapted to the specific requirements of the process industry, in particular, such as mechanical stability, insensitivity to contamination, extreme temperatures, and extreme pressures. Measurement values of these sensors are usually transmitted to a control room, in which process parameters such as fill level, limit level, flow, pressure, or density can be monitored and settings for the entire plant system can be changed manually or automatically.

A sub-area of automation technology relates to logistics automation. With the assistance of distance and angle sensors, processes within a building or within a single logistics system are automated in the area of logistics automation. Typical applications include, for example, systems for logistics automation in the area of baggage and freight handling at airports, in the area of traffic monitoring (toll systems), in trade, package distribution, or also in the area of building security (access control). The examples listed above have in common that a presence detection in combination with an exact measurement of the size and position of an object is required on the respective application side. For this purpose, sensors can be used on the basis of optical measurement methods by means of lasers, LEDs, 2D cameras, or 3D cameras, which detect distances according to the time of flight (ToF) principle.

Another area of automation technology concerns factory/manufacturing automation. Applications for this can be found in a wide variety of industries such as automotive manufacturing, food production, the pharmaceutical industry, or generally in the field of packaging. The goal of factory automation is to automate the production of goods by machines, production lines, and/or robots, i.e. allowing them to run without the involvement of humans. The sensors used here and the specific requirements with regard to measurement accuracy in the detection of the position and size of an object are comparable to those in the previous example of logistics automation. Therefore, sensors based upon optical measurement methods are usually also used on a large scale in the area of factory automation.

To date, in the area of logistics automation as well as in the areas of factory automation and safety technology, optical sensors have dominated. These are fast (fast filling processes at >=10 measurements/second) and cost-effective and can reliably determine the position and/or the distance to an object on the basis of the optical radiation that can be focused with relative ease, which is the basis of the measurement.

Due to current technical developments, however, other sensors, e.g. radar sensors, are becoming increasingly cheap and are therefore suitable for use in automation technology. To date, it has only been possible to connect the measurement signals of multiple dual conductor field devices via external processing devices.

The object of the present invention is to further develop a measuring arrangement with a dual conductor field device in such a way that it can process additional external information.

This object is achieved by a measuring arrangement having the features as described herein.

BRIEF SUMMARY OF THE INVENTION

In a preferred embodiment, a measuring arrangement (100) having a first dual conductor field device (1)
  with a first sensor (10) and
  a first dual conductor interface (11) for the power supply (26) of the first dual conductor field device (1) and for the transmission of data from the dual conductor field device to a superordinate unit (5), wherein
    the first dual conductor field device (1) has at least one second dual conductor interface (12), characterized in that that
the second dual conductor interface (12) is suitably designed to receive data from at least one second dual conductor field device (2).

In another preferred embodiment, the measuring arrangement as described herein, characterized in that the first dual conductor field device (1) comprises an electronic unit for processing measurement data of the first sensor (10) and measurement values of the second dual conductor field device (2).

In another preferred embodiment, the measuring arrangement as described herein, characterized in that the second dual conductor interface (12) is suitably designed to supply power to the second dual conductor field device (2).

In another preferred embodiment, the measuring arrangement as described herein, characterized in that the second dual conductor field device (2) has its own integral or external power supply (36, 26).

In another preferred embodiment, the measuring arrangement as described herein, characterized in that the second dual conductor interface (12) is an interface according to the 4 mA to 20 mA standard.

In another preferred embodiment, the measuring arrangement as described herein, characterized in that the second dual conductor interface (12) is suitably designed to receive power.

In another preferred embodiment, the measuring arrangement as described herein, characterized in that the second dual conductor field device (2) comprises an energy harvesting unit.

In another preferred embodiment, the measuring arrangement as described herein, characterized in that the second dual conductor field device (2) has an energy buffer (15).

In another preferred embodiment, the measuring arrangement as described herein, characterized in that the second dual conductor field device (2) is designed as a speedometer, in particular as a rotary encoder.

DETAILED DESCRIPTION OF THE INVENTION

Figure 1:
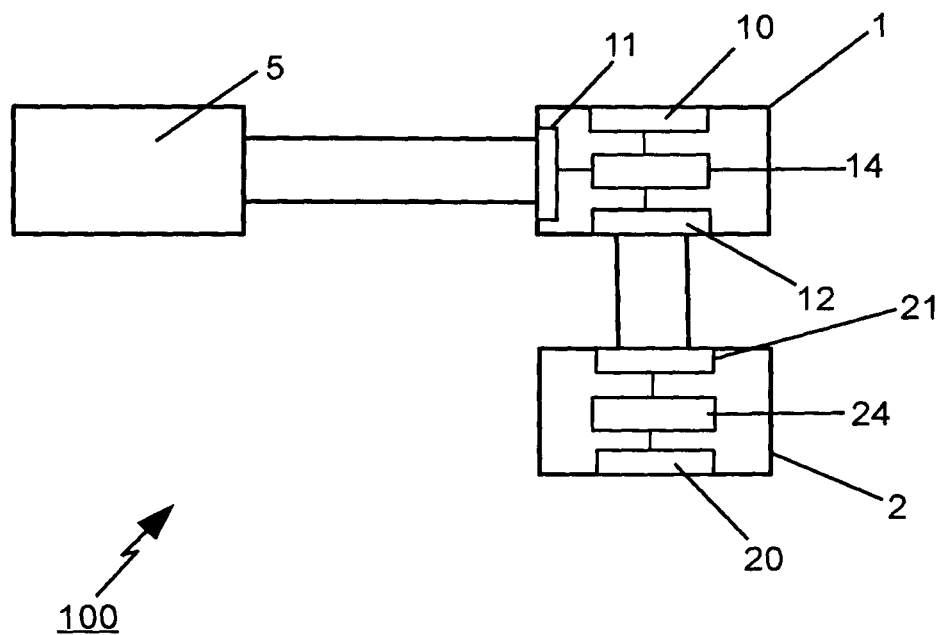
FIG. 1 is a line drawing evidencing a first exemplary embodiment of a measuring arrangement according to the present application.

A measuring arrangement according to the invention, having a first dual conductor field device with a first sensor and a first dual conductor interface for supplying power to the first dual conductor field device and for transmitting data from the first dual conductor field device to a superordinate unit, comprises at least one second dual conductor interface and is characterized in that the at least one second dual conductor interface is suitably designed to receive data from at least one second dual conductor field device.

The dual conductor field device according to the invention thus has a second dual conductor interface, wherein, however, it represents a data input, i.e. the first dual conductor field device can receive data or measurement values from a second dual conductor field device and can also process them in its own measurement value determination and/or measurement value calculation. In this way, for example, data from an external field device is taken into account when determining the measurement value of the first dual conductor field device, and thus a measurement value based on both measurement values is put out by the first dual conductor field device. For this purpose, the second dual conductor field device is preferably configured as a sensor for determining a physical process variable.

A field device is a piece of technical equipment that is directly related to a production process. "Field" refers to the area outside of control cabinets or control rooms. Field devices can thus be both actuators and sensors. In the terminology as used in the present application, superordinate units that are to be assigned to the area of the control rooms must be clearly differentiated from field devices.

The second measurement value can be, for example, a measurand determined by the second dual conductor field device, for example, a pressure, a fill level, a temperature, or a speed. Measurement data determined by the first dual conductor field device can thus be compensated, corrected, or further processed by means of the second measurement value, for example.

For this purpose, the first dual conductor field device preferably comprises an electronic unit for processing measurement data of the first sensor and measurement values of the second dual conductor field device. In this way, it is possible for a measurement value to be determined in the first dual conductor field device.

Alternatively, in the case of a digital communication between at least the first dual conductor field device and the superordinate unit, the measurement value of the second dual conductor field device can also be passed on separately to the superordinate unit.

Preferably, the second dual conductor interface is designed to supply the second dual conductor field device with power. According to the 4 mA to 20 mA protocol, the second dual conductor interface of the first dual conductor field device is thus the superordinate unit for the second dual conductor field device to which the measurement values are transmitted. Communication between the second dual conductor field device and the first dual conductor field device can be analog and/or digital, wherein conventional protocols, e.g. the 4 mA to 20 mA standard or the HART protocol, are preferably used.

In addition or alternatively, the second dual conductor field device can have its own integral or external power supply. In this way, the second dual conductor field device can also be operated reliably in situations in which there is insufficient power available in the first dual conductor field device to supply the second dual conductor field device. Even if the first dual conductor field device cannot in principle provide sufficient power for supplying the second dual conductor field device, its operation can take place independently of the power supply of the first dual conductor field device by means of an integral or external power supply of the second dual conductor field device.

The second dual conductor interface can preferably be an interface according to the 4 mA to 20 mA standard. This means that the second dual conductor field device can transmit measurement values to the first dual conductor field device according to the 4 mA to 20 mA standard. This can be done regardless of whether the second dual conductor field device has an internal or external power supply. If the second dual conductor field device is supplied with power by the first dual conductor field device, then the measurement values of the current flowing in the dual conductor loop can be transmitted. However, when the second dual conductor field device has its own power supply, it can also actively change the current flowing in the dual conductor loop, as well as adjust the current by its own power supply as a function of a measurement value.

The second dual conductor interface can also be suitably designed to receive power. In particular, when the second dual conductor field device has its own power supply, whether internally or externally, it can supply power to the first dual conductor field device via the second dual conductor interface. For this purpose, the second dual conductor interface can be configured as an energy sink, which for example, charges an energy buffer in the first dual conductor field device.

The second dual conductor field device can comprise an energy harvesting unit by means of which the second dual conductor field device itself and/or the first dual conductor field device is supplied with power. The energy harvesting unit can, in particular, charge an energy buffer of the second dual conductor field device, so that the stored power can be used for power supply or in case of an increased power requirement of the second dual conductor field device. For this purpose, the second dual conductor field device can have its own energy buffer, which can be charged by the energy harvesting unit and/or the first dual conductor field device.

The term energy harvesting is understood to mean the extraction of small amounts of electrical energy from the environment, for example by exploiting the Piezo effect, the thermoelectric effect, or the conversion of electromagnetic radiation present in the environment.

The second dual conductor field device can be configured, in particular, as a speedometer, preferably as a rotary encoder. For example, the speed of a conveyor belt can be determined by a speedometer. In connection with a radiometric sensor as a first dual conductor field device, a volume flow of material located on the conveyor belt can be determined in this way.

Alternatively, the first dual conductor field device can also be configured as a radar sensor or as an optical sensor, by means of which a contour of the material located on the conveyor belt and thus, with the assistance of the speed of the conveyor belt, the volume flow of the material transported on the conveyor belt can be determined.

It should be noted at this point that the first dual conductor field device can also have multiple second dual conductor interfaces for receiving data from additional dual conductor field devices. In this way, the data of multiple additional dual conductor field devices can be used to determine a cumulative measurement value. For example, a speed of a conveyor belt and a current ambient temperature can be processed in order to determine a volume flow on a conveyor belt. Thus, a determined measurement value can be temperature-compensated even before transmission to a superordinate unit.

DETAILED DESCRIPTION OF THE FIGURES

FIG. 1 shows a first exemplary embodiment of a measuring arrangement 100 according to the present application.

The measuring arrangement 100 according to FIG. 1 shows a first dual conductor field device 1, which is connected to a superordinate unit 5 by means of a two-wire line. Specifically, an electronic module 14 of the first dual conductor field device 1 is connected to the superordinate unit 5 via a first dual conductor interface 11. The first dual conductor interface 11 is also shown as a separate component in FIG. 1 for better illustration but is part of the electronic module 14. The dual conductor connection between the superordinate unit 5 and the first dual conductor interface 11 occurs according to the 4 mA to 20 mA standard, according to which an analog measurement value transmission from the first dual conductor field device 1 to the superordinate unit 5 as well as a power supply of the first dual conductor field device 1 by the superordinate unit 5 takes place.

The electronic module 14 is further connected in the usual manner to a first sensor 10 of the first dual conductor field device 1, so that measurement values determined by the first sensor 10 can be transmitted to the superordinate unit 5 via the first dual conductor interface 11 after a processing and/or preparation by the electronic module 14. The electronic module 14 is further connected to a second dual conductor interface 12, which is designed to receive data from a second dual conductor field device 2. In the present case, the second dual conductor interface 12 is also shown as a separate component but is systematically integrated into the electronic module 14 in the structural design of the dual conductor field device.

The first dual conductor field device 1 is connected to the second dual conductor field device 2 via the second dual conductor interface 12 by means of a two-wire line. For this purpose, the second dual conductor field device 2 comprises a dual conductor interface 21, to which the two-wire line coming from the first dual conductor field device 1 is connected. The dual conductor interface 21 is in turn part of the electronic module 24 of the second dual conductor field device 2, wherein this dual conductor interface 21 is also drawn as a separate component for better illustration.

The second dual conductor field device 2 has a second sensor 20, which is connected to the electronic module 24. Measurement values determined by the second sensor 20 are further processed by the electronic module 24 and transmitted to the first dual conductor field device 1 via the dual conductor interface 21 of the second dual conductor field device 2.

In the exemplary embodiment shown in FIG. 1, the second dual conductor field device 2 is supplied with power via the two-wire line from the first dual conductor field device 1 and its second dual conductor interface 12, so that the second dual conductor field device 2 does not have to have either an internal or an external power supply of its own. The power supply and measurement value transmission between the second dual conductor field device 2 and the first dual conductor field device 1 occurs according to the 4 mA to 20 mA standard. The second dual conductor field device 2 or the electronic module 24 installed there can comprise an energy buffer, for example in the form of a capacitor or an accumulator, in order to ensure the power supply of the second dual conductor field device 2. In this way, it can be ensured that the second dual conductor field device 2 can also be operated reliably in times when the first dual conductor field device 1 cannot provide sufficient power.

Figure 2:
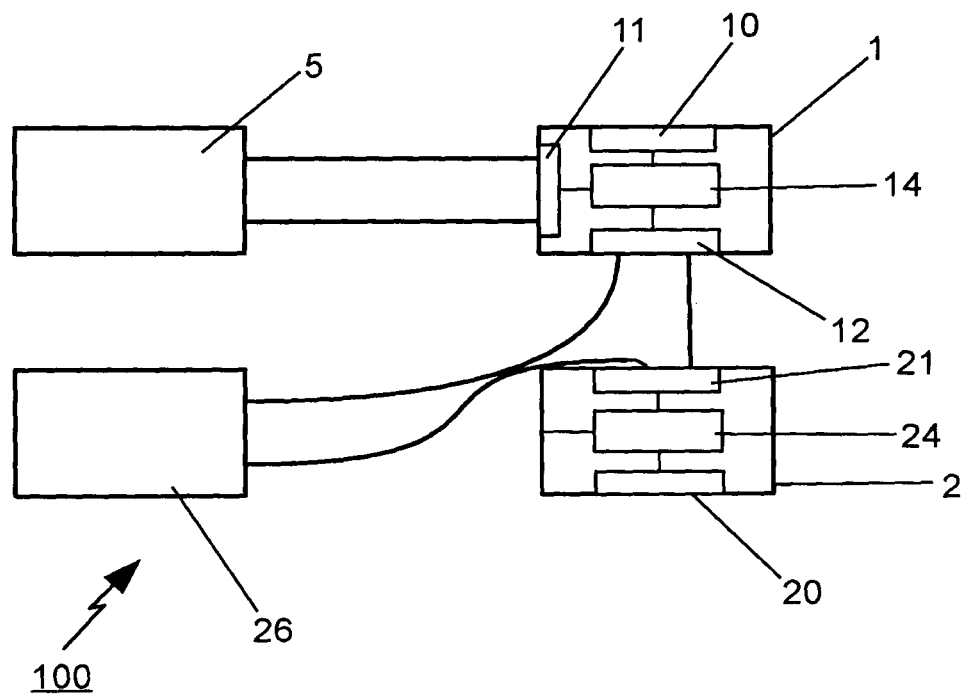
FIG. 2 is a line drawing evidencing a second exemplary embodiment of a measuring arrangement according to the present application.

FIG. 2 shows a second exemplary embodiment of a measuring arrangement according to the present application.

By contrast to the exemplary embodiment shown in FIG. 1, the second dual conductor field device 2 in the embodiment of FIG. 2 is not completely supplied with power via the second dual conductor interface 12 of the first dual conductor field device 1, but rather has an external power supply 26, which is arranged in the current loop between the first dual conductor field device 1 and the dual conductor field device 2. In the present exemplary embodiment, the external power supply 26 is designed as a transducer feeding device and supplies the second dual conductor field device 2 with sufficient power. Via the dual conductor interface 21 of the second dual conductor field device 2, measurement values that are determined by the second sensor 20 of the second dual conductor field device 2 and processed by the electronic module 24 are transmitted to the first dual conductor field device 1 according to the 4 mA to 20 mA standard, i.e. a corresponding current is impressed into the dual conductor current loop according to the determined measurement value, detected via the second dual conductor interface 12 of the first dual conductor field device 1 by the electronic module 14 of the first dual conductor field device 1, and processed further.

In the specific exemplary embodiment, the first dual conductor field device 1 can be configured as a radiometric density and fill level sensor for determining a height profile and the density of a material conveyed on a conveyor belt, for example a bulk material. In this case, the second dual conductor field device 2 can be configured as a rotary encoder for determining a speed of the conveyor belt, for example, so that a volume flow of the conveyed material can be calculated from the height profile and the density of the material conveyed on the conveyor belt as well as the speed of the conveyor belt. The speed of the conveyor belt is transmitted from the second dual conductor field device 2 via its dual conductor interface 21 to the second dual conductor interface 12 of the first dual conductor field device 1 and forwarded to the electronic module 14 of the first dual conductor field device 1 and the volume flow of the material conveyed on the conveyor belt is calculated in the electronic module 14 of the first dual conductor field device 1 and transmitted to the superordinate unit 5 via the first dual conductor interface 11. In this way, an additional cabling is only necessary between the first dual conductor field device 1 and the second dual conductor field device 2; the usually significantly longer cabling to the superordinate unit 5 must only be produced once between the first dual conductor field device 1 and the superordinate unit 5.

Figure 3:
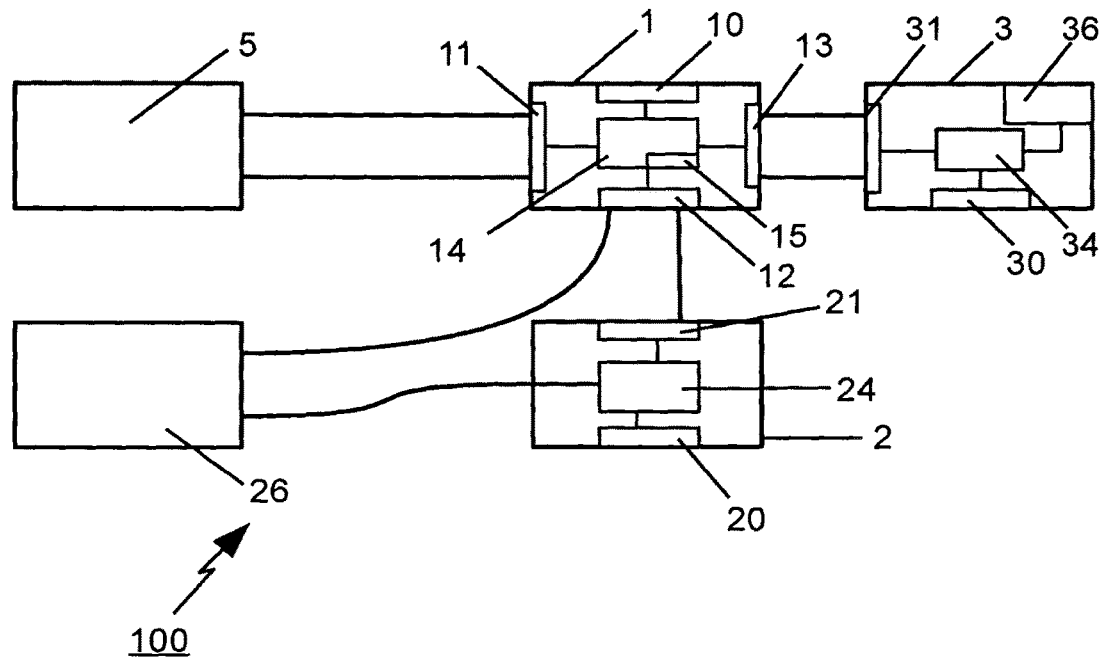
FIG. 3 is a line drawing evidencing a third exemplary embodiment of a measuring arrangement according to the present application.
Figure 4:
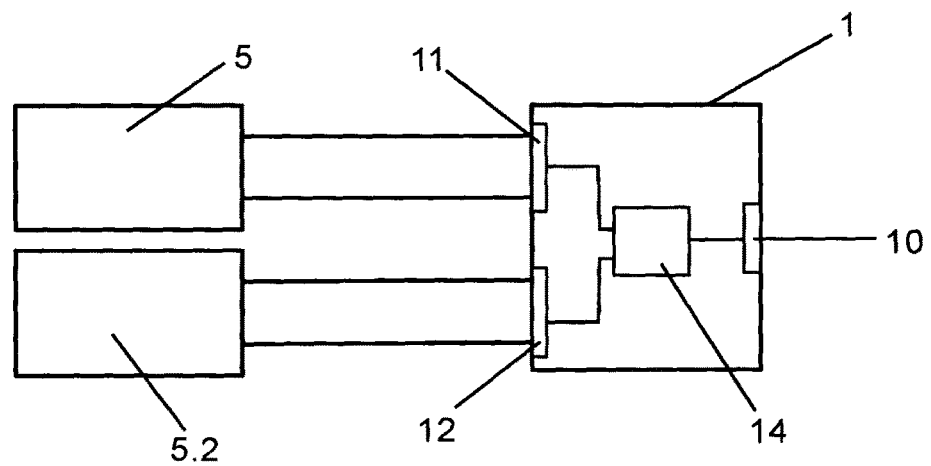
FIG. 4 is a line drawing evidencing a measuring arrangement according to the prior art.

FIG. 3 shows a third exemplary embodiment of a measuring arrangement 100 according to the present application.

The measuring arrangement 100 according to the illustration in FIG. 3 comprises the structure of the measuring arrangement 100 already explained with reference to FIG. 2, wherein the first dual conductor field device 1 additionally comprises a third dual conductor interface 13 for receiving data from a third dual conductor field device 3. The third dual conductor field device 3 in turn has a dual conductor interface 31 and an electronic module 34, which are connected to a third sensor 30 in the manner described above. In addition, the third dual conductor field device 3 has an integrated power supply 36, which is designed in the present exemplary embodiment as an energy harvesting module. Through the energy harvesting module 36 and an energy buffer connected thereto, the third dual conductor field device 3 can be operated in an energy self-sufficient manner and can transmit measurement values via the dual conductor interface 31 by means of a two-wire line to the third dual conductor interface 13 of the first dual conductor field device 1.

In the exemplary embodiment shown in FIG. 3, the first dual conductor field device 1 also has an energy buffer 15, which serves to buffer power from phases of increased power demand.

It should be noted at this point that the individual embodiments of the dual conductor field devices described in FIGS. 1-3 can be combined with one another in any desired and meaningful manner, resulting in further advantageous embodiments of the present invention.

LIST OF REFERENCE NUMBERS 1 first dual conductor field device
2 second dual conductor field device
3 third dual conductor field device
5 superordinate unit
5.2 second superordinate unit
10 first sensor
11 first dual conductor interface
12 second dual conductor interface
13 third dual conductor interface
14 electronic module
15 energy buffer
20 second sensor
21 dual conductor interface of the second field device
26 power supply
30 third sensor
31 dual conductor interface of the third field device
34 electronic module
36 power supply
100 measuring arrangement Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A measuring arrangement, comprising:
   a first two wire field device, with a first sensor,
   a first two wire interface for a power supply of the first two wire field device and for the transmission of data from the first two wire field device to a superordinate unit, wherein
   the first two wire field device has at least one second two wire interface designed to receive data from at least one second two wire field device,
   wherein power and/or signal transmission between the first two wire field device, the second two wire field device and the superordinate unit occurs according to the known 4 mA to 20 mA standard.

2. The measuring arrangement of claim 1, wherein the first two wire field device comprises an electronic unit for processing measurement data of the first sensor and measurement values of the second two wire field device.

3. The measuring arrangement of claim 1, wherein the second two wire interface is designed to supply power to the second two wire field device.

4. The measuring arrangement of claim 3, wherein the second two wire field device has its own integral or external power supply.

5. The measuring arrangement of claim 1, wherein the second two wire interface is an interface according to the 4 mA to 20 mA standard.

6. The measuring arrangement of claim 1, wherein the second two wire interface is designed to receive power.

7. The measuring arrangement of claim 1, wherein the second two wire field device comprises an energy harvesting unit.

8. The measuring arrangement of claim 1, wherein the second two wire field device has an energy buffer.

9. The measuring arrangement of claim 1, wherein the second two wire field device is a speedometer.

10. The measuring arrangement of claim 1, wherein the second two wire field device is a rotary encoder.

* * * * *